Figure 12:
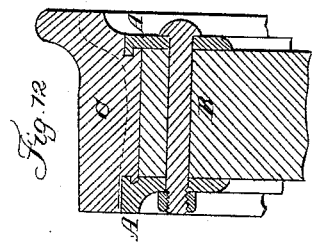

R. C. MANSELL.
Car Wheel
No. 58,741.
2 Sheets—Sheet 1.
Patented Oct. 9, 1866
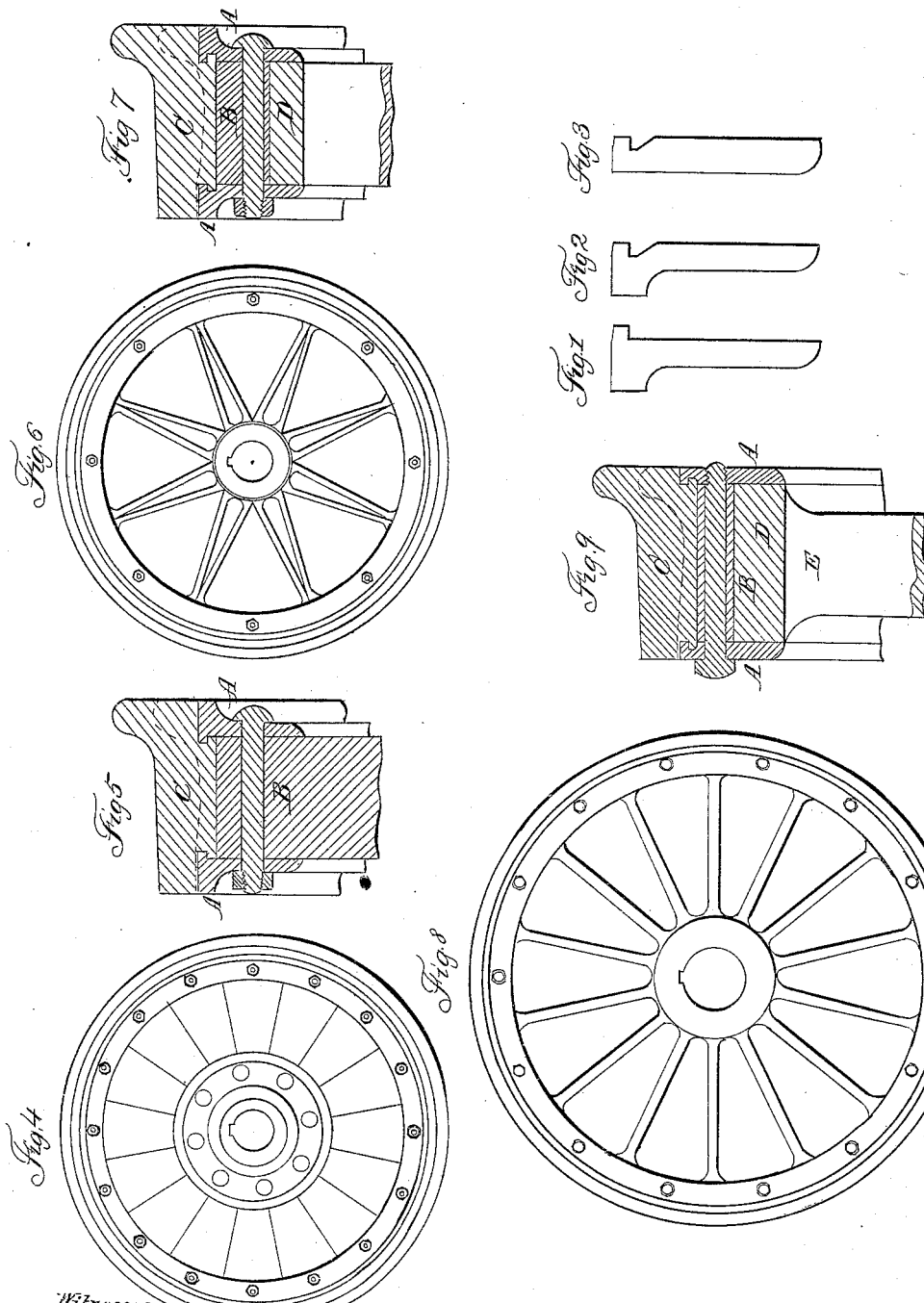
Witnesses.
John Gedge
Inventor.
Rich C Mansell R. C. MANSELL.
Car Wheel.

No. 58,741.

2 Sheets—Sheet 2.

Patented Oct. 9, 1866.

Witnesses.

Inventor.

UNITED STATES PATENT OFFICE.

RICHARD C. MANSELL, OF ASHFORD, COUNTY OF KENT, ENGLAND.

IMPROVED CAR-WHEELS.

Specification forming part of Letters Patent No. 58,741, dated October 9, 1866.

*To all whom it may concern:*

Be it known that I, RICHARD CHRISTOPHER MANSELL, of Ashford, in the county of Kent and Kingdom of England, engineer, have invented Improvements in the Construction of Wheels for Engines and Vehicles used on Railways; and I do hereby declare that the following is a full and exact description of the same, reference being had to the accompanying sheets of drawings, to the figures drawn thereon, and to the letters of reference placed on the diagrams.

My improvements in the construction of wheels for engines and vehicles used on railways consist in making certain new and improved forms of retaining-rings or tire-fastenings, and fixing them, in combination with the tyres of wheels, in such a manner that they will not only hold tires to the bodies of wheels, but will also support and sustain in proper position the parts of tires which project over the sides of the wheels, and by so doing admit of the tires being worn thinner than at present and prevent the mischief consequent on the present system, which allows the sides of tires to project and in wear to bend over the retaining-rings or tire-fastenings and sometimes break off, which defects not only make the tires of wheels less serviceable and difficult to be removed for repairs, but they also render wheels in a degree unsafe, by reason of the irregularity of edge and loss in width of tire-surface bearing upon the rails; and having thus explained the object of my said invention, I will proceed to describe and show its nature.

In the annexed drawings I have represented several figures illustrating my invention and some of the principal variations or modifications of which it is susceptible, and demonstrating or exemplifying the manner in which it is to be and may be performed or put in practice.

Figure 1, Sheet 1, represents the cross-section of one form of my improved retaining-rings, it being made with a rib or flange projecting from each side of its outer periphery. Fig. 2 represents the cross-section of another or cranked form of my improved retaining-rings, it having a rib or flange projecting only from the outside and its inner side grooved to suit and receive the lip of the tire; and Fig. 3 represents the cross-section of that form of my improved retaining-rings which is made from flat bars of metal having a groove formed in its inner surface to suit and receive the lip of the tire.

And in carrying out this invention I use any of the usual descriptions of wheel bodies or centers, and apply thereto one or other of these my improved forms of retaining-rings or tire-fastenings, taking care in all cases to make their outside flanges project sufficiently outward to enable them to support the hitherto weak parts of tires which project over the sides of the bodies of wheels.

Fig. 4 represents a front elevation of my improved wood-disk wheel with one form of my improved retaining-rings attached thereto. This arrangement of rings, in combination with the tire and part of the wood disk, is shown in cross-section by Fig. 5. C represents the tire; B, part of the wood disk, and A A the improved retaining-rings, with their outer flanges projecting, so as to support the tire at its outer sides, and thereby enable it to be worn down to the position shown by the dotted line.

Fig. 6 represents a front elevation of my improved iron wheel with another form of my improved retaining-rings attached, Fig. 7 representing the cross-section of its tire, wood lining, and improved retaining-rings, A A representing the rings, B the wood lining, C the tire, and D the rim of the iron body. The section of retaining-rings shown at Fig. 1 may also be applied to this wheel.

Fig. 8 represents my improved wrought-iron wheel same as last mentioned, but having its rim sufficiently wide to admit of the application of my improved retaining-rings made from flat bars of metal, and Fig. 9 represents a cross-section of its tire-rim and retaining-rings with elevation of part of a spoke. A A represent the rings; B, the wood lining; C, the tire; D, the rim, and E part of a spoke.

Figure 11:
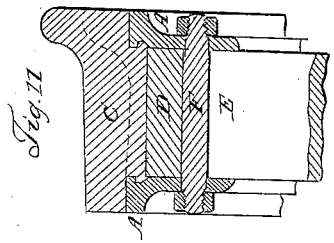
Figure 10:
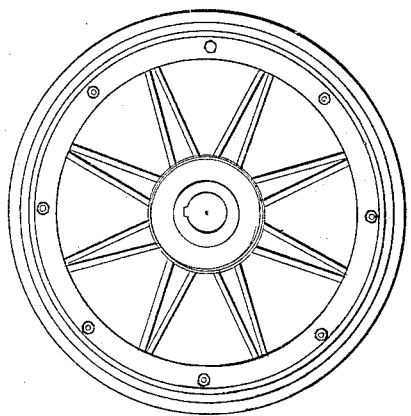

Fig. 10, Sheet 2, represents an ordinary iron wheel with one of my improved retaining-rings attached thereto, and Fig. 11 a cross-section of its tire-retaining rings, rim, and elevation of part of a spoke. A A represent the retaining-rings; C, the tire; D, the rim of the iron body, and E part of a spoke.

The improved retaining-rings are attached in the usual manner, either by ordinary screws, rivets, screw-bolts, or bolts and nuts, securing them to the tire and body of the wheel, and in this case bolts shouldered at each end are represented by F passing within and close to the inner circumference of the rim of the wheel; and in Fig. 9 the inner retaining-ring is represented as being tapped or screwed, and the screw-bolt F passing through the front or outer ring and screwed into the inner ring, so as to leave no projection beyond the face of the latter; and in carrying out these improvements care must be taken to fit the outer periphery of each improved retaining-ring accurately within the projecting parts of the tires, so as to secure the necessary support when the tires are worn down.

The dotted lines on Figs. 5, 7, 9, 11, and 12 show the section of worn-out tires when used with the improved retaining-rings; and it will be seen that the use of these improved retaining-rings or tire-fastenings allows the tires of wheels to be worn longer and much thinner than is the case with any other description of wheel, and thereby save a considerable expense in maintenance, besides insuring safety by means of the support given to the projecting and consequently weak parts of tires, and preventing the danger of their bending inward toward the center of the wheel and breaking off.

Figure 17:
Figure 16:
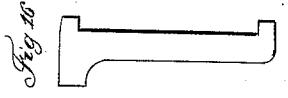
Figure 15:
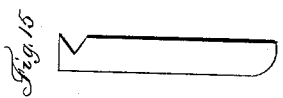
Figure 14:
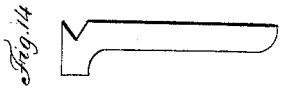
Figure 13:
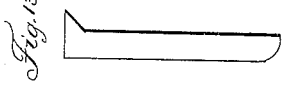

Having thus set forth the nature of my invention and described the illustration thereof, as represented on the drawings, and the manner of carrying it into operation, I would here remark that I do not confine myself to the particular form throughout of the sections shown at Figs. 1, 2, and 3, as they may be varied and made as shown by Figs. 13, 14, and 15, or in other modified shapes to suit the section of the tires that may be used; nor do I confine myself to using two of my improved retaining-rings to each wheel, as one only may be used in combination with an ordinary ring, as shown in cross-section by Fig. 12; neither do I confine myself to using the particular sections of the improved retaining-rings to the respective descriptions of wheels shown in combination on the diagrams, as I use any description of the improved rings to any description of wheel body or center to which they may be applicable; nor do I confine myself to the use of rings flanged only on their outer peripheries, as they may also be furnished with additional ribs or flanges on their inner peripheries, (see Figs. 16 and 17,) and in the latter case segments may be used in lieu of solid rings; and although I prefer to use welded or continuous rings, yet the rings may be used unwelded.

I intend it to be understood and I hereby declare that I claim—

The exclusive use as of my invention of the improvements in the construction of wheels for engines and vehicles used on railways by the adaptation and application thereto of retaining-rings or tire-fastenings formed with outer flanges to support the parts of tires which project over the sides of the bodies of wheels, and also the exclusive use of the adaptation and application to wheels of retaining-rings or tire-fastenings made from flat bars of metal, the whole substantially as herein set forth, described, and illustrated in and by the annexed sheets of drawings.

RICH. C. MANSELL.

Witnesses:
JOHN GEDGE, Jr.,
*Patent Agent, No. 11 Wellington Street, Strand, London.*
W. E. GEDGE,
*Patent Agent, No. 11 Wellington Street, Strand, London.*